E. LETORD.
SPRING SUSPENSION DEVICE FOR INDICATING AND REGISTERING INSTRUMENTS.
APPLICATION FILED JAN. 19, 1918.
1,307,685.
Patented June 24, 1919.
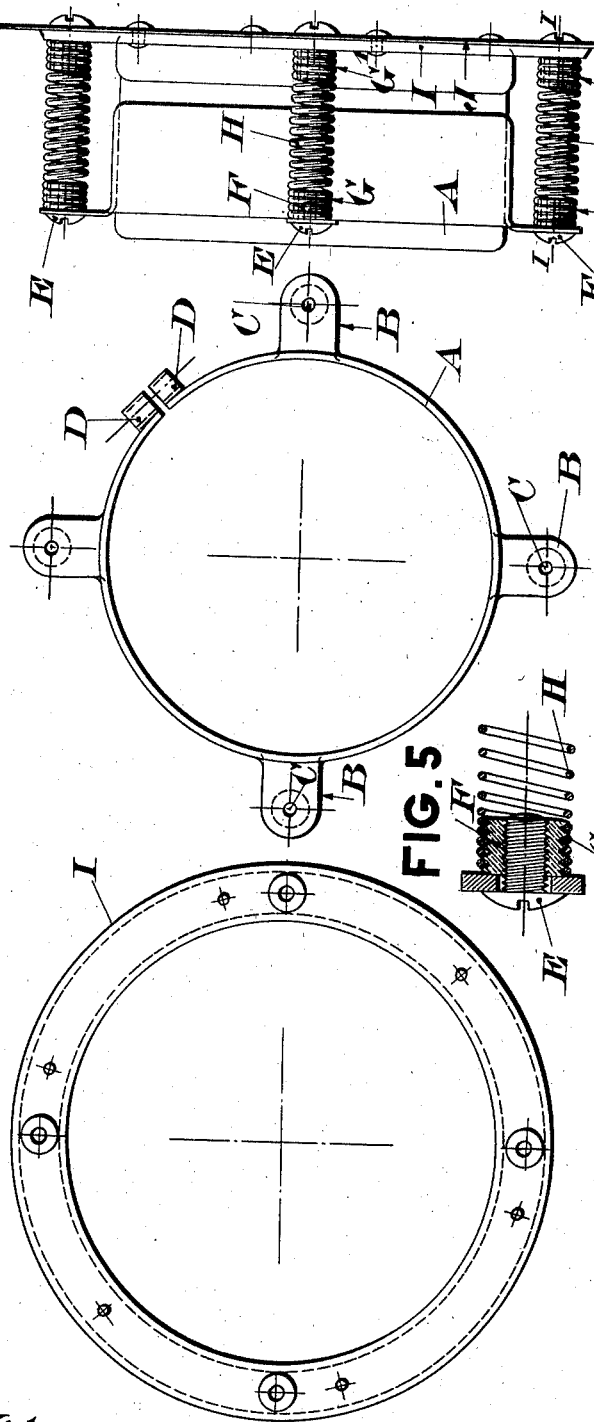
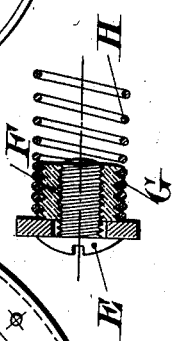
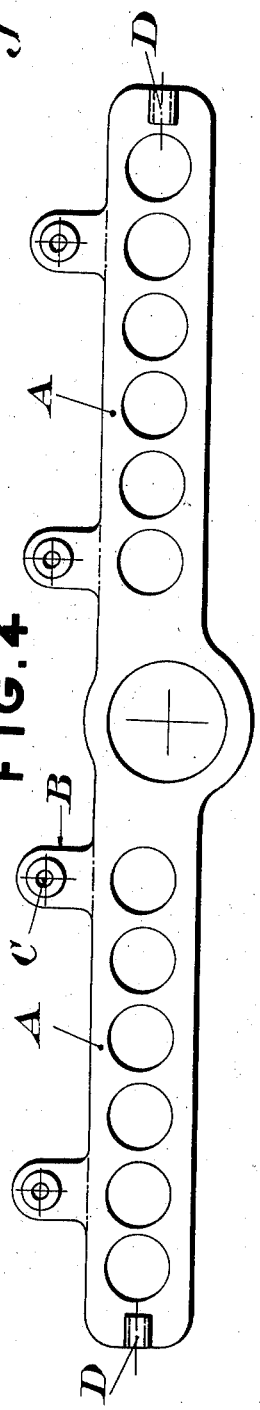
Witnesses
Jean Termain
Gaston Geay
Inventor
Emile Letord

UNITED STATES PATENT OFFICE.

EMILE LETORD, OF MEUDON, FRANCE.

SPRING SUSPENSION DEVICE FOR INDICATING AND REGISTERING INSTRUMENTS.

1,307,685.  Specification of Letters Patent.  Patented June 24, 1919.

Application filed January 19, 1918. Serial No. 212,794.

*To all whom it may concern:*

Be it known that I, EMILE LETORD, a citizen of the French Republic, residing at Meudon, Seine-et-Oise, in France, have invented certain new and useful Spring Suspension Devices for Indicating and Registering Instruments, of which the following is a specification.

This invention relates to spring suspension devices for indicating and registering instruments.

In motor cars, aëroplanes, dirigible balloons and the like in which the motive power is obtained by explosion motors, the vibrations of these motors more or less impart accentuated vibrations to the motor car, aeroplane or the like.

Such vibrations are injurious to indicating or registering instruments of delicate construction carried by the motor car or the like and troublesome when reading the indicating instruments.

The present invention has for its object to remedy these drawbacks and to avoid to a certain extent, the transmission of the vibrations to the instruments.

The annexed drawing illustrates, by way of example, a spring suspension device constructed according to the said invention, for fixing a revolution-counter.

Figure 1 is a side view.

Fig. 2 shows a disk riveted inside the metal sheet of the bonnet of the motor.

Fig. 3 shows a fixing member for the revolution-counter.

Fig. 4 shows this member developed.

Fig. 5 is partial section on line 1—1, of Fig. 1, drawn to an enlarged scale.

The indicating or recording instrument to be connected in an elastic manner to the motor car, aeroplane or the like is surrounded by a collar A having several lugs B pierced with holes C. The tightening of the collar around the instrument is secured by a bolt passing through the lugs D.

In each lug B is a screw E (see Figs. 1 and 5) tightening a nut F which supports the one extremity G of a spiral spring H, of suitable elasticity.

At the end G of the spring H the coils thereof are in contact. The nut F carries externally a triangular thread which corresponds to the thread of the end G of the spring H; the outer diameter of the nut F being a little large, the end G of the spring H is simply screwed by force onto the thread of the nut F.

The other end $G^1$ of the spring H is similarly arranged for fixing to a metal ring I which is fixed on the instrument board. In certain cases the metal ring I may be omitted: the end $G^1$ of the spring H is then screwed directly on the board.

The ring I can be fixed on the front surface J of the instrument board, and the latter cut away to the extent of the space within the ring I. Then the dial of the instrument can lie freely within the ring I and can be read from the front side of the instrument board, the spring mounts of the device being hidden and protected behind the board.

What I claim as my invention and desire to secure by Letters Patent of the United States is:—

1. A spring suspension device for indicating or recording instruments comprising a collar, means for tightening said collar around the instrument, a series of lugs on said collar, a plate adapted to be secured to the vibratory support for the instrument and spiral springs connecting said lugs to said plate so that the collar and with it the instrument is elastically mounted on said support.

2. A spring suspension device for indicating or recording instruments comprising a perforated collar, means for tightening said collar around the instrument, a series of lugs projecting from said collar, each of which is provided with an orifice, an annular plate adapted to be secured to a support, said plate having a series of orifices spaced opposite the orifices in said lugs, a screw passing through each orifice of both series, nuts on said screws and spiral springs connecting opposing nuts to one another whereby said collar is elastically attached to said annular plate.

In witness whereof I have signed this specification in the presence of two witnesses.

EMILE LETORD.

Witnesses:
JEAN GERMAIN,
MARIN VACHON.